Patented Nov. 21, 1939

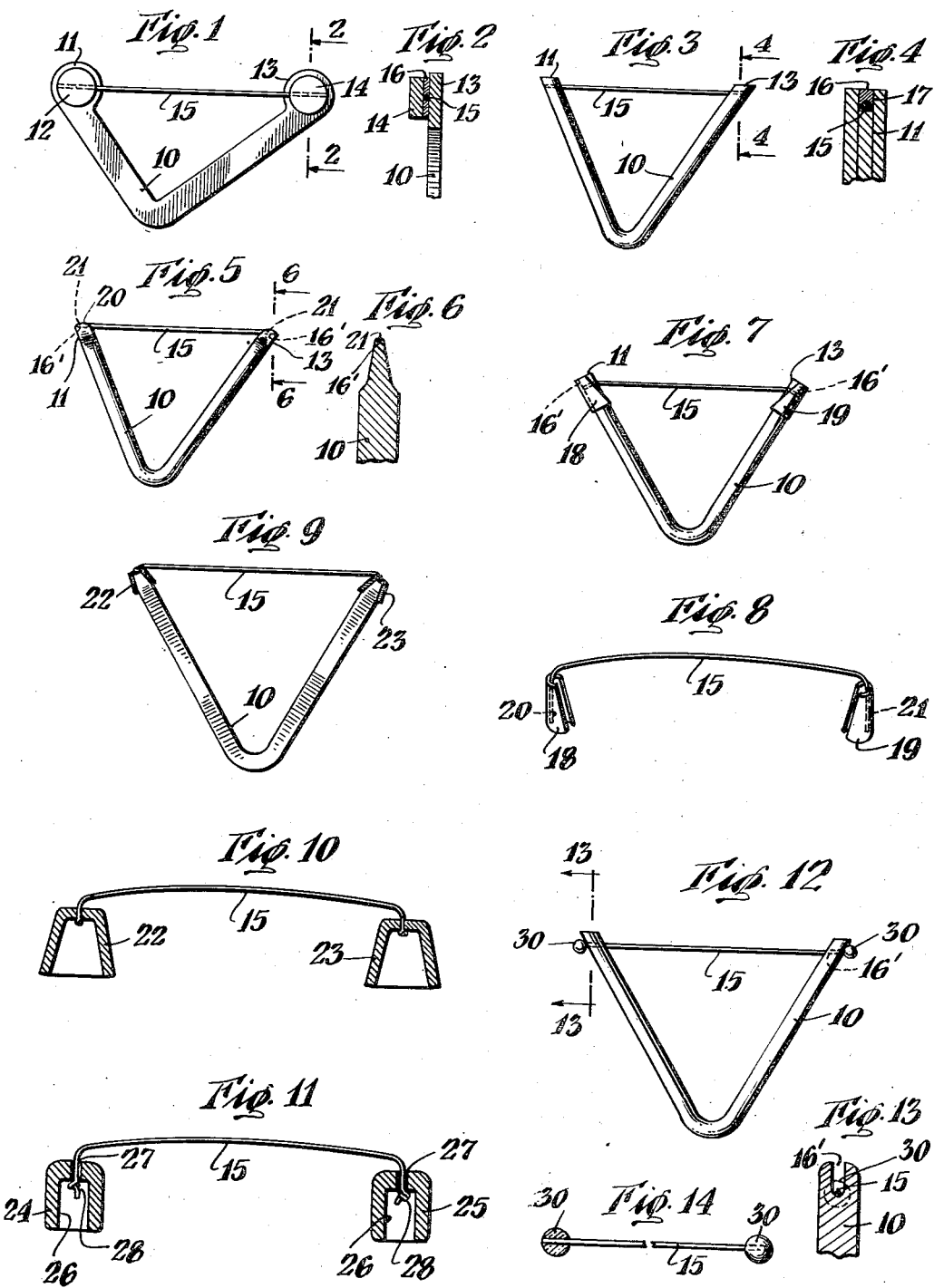
Nov. 21, 1939.   I. HENNE   2,180,522
DENTAL FLOSS THROW-AWAY UNIT AND METHOD OF MAKING SAME
Filed Nov. 1, 1938   2 Sheets-Sheet 1
INVENTOR
Isabelle Henne
BY Charles A. Morton
ATTORNEY

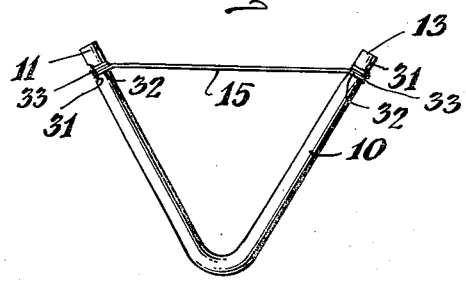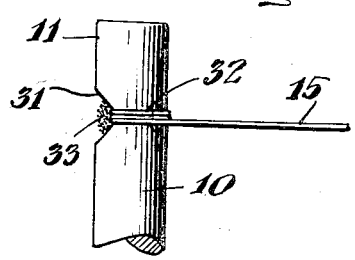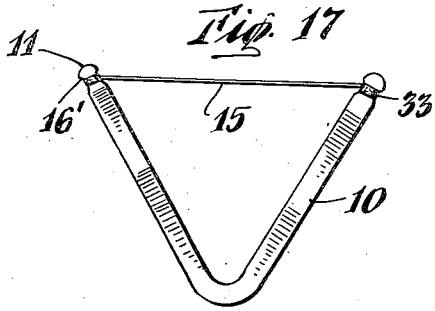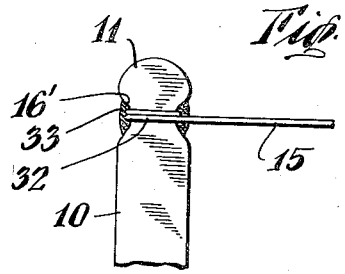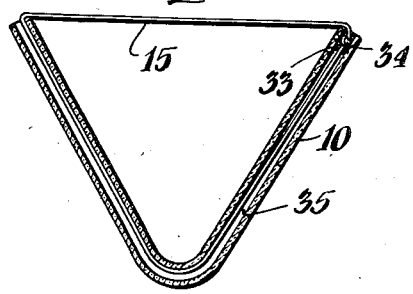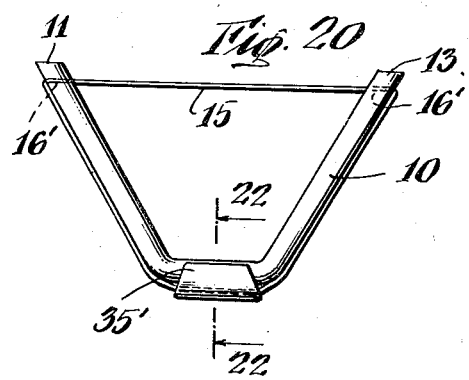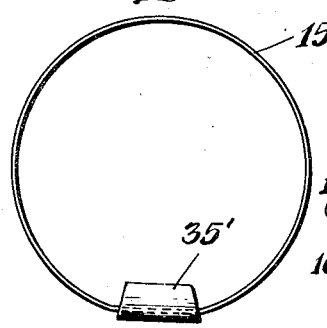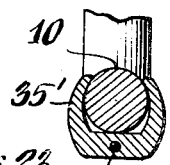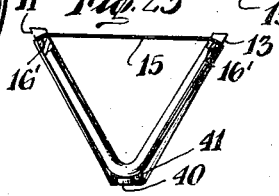

2,180,522

UNITED STATES PATENT OFFICE 2,180,522

DENTAL FLOSS THROW-AWAY UNIT AND METHOD OF MAKING SAME

Isabelle Henne, Brooklyn, N. Y.

Application November 1, 1938, Serial No. 238,287

12 Claims. (Cl. 132—91)

This invention relates to a dental floss throw-away unit and method of making same, and the present application is a continuation in part of my former applications, Serial Numbers 189,311, filed February 8, 1938; and 198,008, filed March 25, 1938.

The object of this invention is a relatively inexpensive sanitary throw-away dental floss unit which can be carried in the pocket or purse.

Another object is improved means for anchoring the dental floss or thread and for maintaining the unit of dental floss or thread stretched under tension when in operative position.

Another object is an improved anchoring attachment for a replaceable throw-away unit length or unit loop of dental floss.

Another object is a handle member to which the sanitary throw-away dental unit may be detachably secured.

Another object is a method of making a dental floss unit.

Other objects will appear from detailed description which follows.

In the drawings comprising two sheets of 23 figures numbered Figs. 1 to 23 inclusive:

Fig. 1 is a front view of one form of throw-away unit.

Fig. 2 is a vertical cross sectional view taken along the line 2—2 of Fig. 1.

Fig. 3 is a front view of a modified form of throw-away unit.

Fig. 4 is a vertical cross sectional view taken along the line 4—4 of Fig. 3.

Fig. 5 is a front view of another modified form of throw-away unit.

Fig. 6 is a vertical cross sectional view taken along the line 6—6 of Fig. 5.

Fig. 7 is a front view of another modified form of throw-away unit.

Fig. 8 is a perspective view of a replaceable unit length of dental floss for use in conjunction with the throw-away unit of Fig. 7.

Fig. 9 is a front view partly in cross section of another modified form of throw-away unit.

Figs. 10 and 11 are front views partly in cross section of replaceable unit lengths of dental floss for use in conjunction with the throw-away unit of Fig. 9.

Fig. 12 is a front view of another modified form of throw-away unit.

Fig. 13 is a vertical cross section taken along the line 13—13 of Fig. 12, looking in the direction of the arrows.

Fig. 14 is a front view partly in cross section of a replaceable unit length of dental floss for use in conjunction with the throw-away unit of Fig. 12.

Fig. 15 is a front view of another modified form of throw-away unit.

Fig. 16 is an enlarged view of a detail of the throw-away unit construction of Fig. 15.

Fig. 17 is a front view of another modified form.

Fig. 18 is an enlarged view of a detail of the throw-away unit construction of Fig. 17.

Fig. 19 is a vertical cross sectional view of another modified form of dental floss throw-away unit.

Fig. 20 is a front view of another modified form of throw-away unit.

Fig. 21 is a front view of a replaceable unit loop of dental floss for use in conjunction with the throw-away unit of Fig. 20.

Fig. 22 is a vertical cross sectional view taken along the line 22—22 of Fig. 20, looking in the direction of the arrows; and Fig. 23 is a front view of another modified form of throw-away unit.

Like reference characters designate corresponding parts throughout the several figures of the drawings.

Referring to Figs. 1 and 2 the throw-away unit consists of a bow frame 10 made of Celluloid or other inexpensive plasticizable material. The bow frame may be either L shaped as shown in Fig. 1, V shaped or U shaped, and the bow frame may be flat, square, circular, semi-circular, or of any other preferred cross section. The bow frame 10 terminates in the bow tips 11 and 13, and the bow tips may be enlarged as shown in Fig. 1, to increase the area of anchorage for the opposite ends of the unit of dental floss 15. A quantity of a suitable volatile solvent is applied to the faces of the bow tips 11 and 13 to plasticize the bow tips, and the opposite ends of a unit length of dental floss are embedded in the walls of the bow tips, which may be further protected by dipping the cover members 12 and 14 made of plasticizable material of similar composition to the bow frame 10 into the volatile solvent, and then placing the cover members 12 and 14 upon the bow tips over the embedded ends of the dental floss and applying pressure to the cover members to merge or fuse the cover members with the bow tips so as to securely anchor the ends of the dental floss between bow tips 11 and 13 and their respective cover members 12 and 14 after the solvent has evaporated and the plastic material has hardened again. The bow frame 10 may be made of strip Celluloid substantially rectangular in cross section, and due to the inherent elasticity of the material the diverging arms of the bow frame tend to spread apart, but may be moved towards each other under finger pressure while the dental floss is being secured in proper position, so that when pressure is removed the diverging arms of bow frame 10 tend to separate thus maintaining the unit length of dental floss 15 under proper tension. Bow frame 10 is small enough to permit insertion in the mouth with the dental floss 15 engaging in the spaces between adjacent teeth to remove foreign particles therefrom.

In the modification shown in Fig. 3 the bow frame 10 which may consist of a series of laminations of plastic material cemented together under pressure is provided with tips which may be notched at 17 (Fig. 4); the bow tips 11 and 13 are then moved towards each other under finger pressure while the unit length of dental floss 15 is embedded in the notched tips 17, either by dipping the bow tips 11 and 13 in a volatile solvent such as acetone or the like, or otherwise applying said volatile solvent thereto, and then applying pressure to the bow tips or by filling the notched tips 17 with Celluloid plastic 16 so as to embed the opposite ends of the unit length of dental floss in the plastic which is then allowed to dry and set before pressure is removed from the bow tips. The dental floss or thread may be applied to the bow tips either before or after the Celluloid material is plasticized. The volatile solvent evaporates rapidly thus allowing the plastic material 16 to dry and harden, whereupon the bow tips are released and allowed to spring apart thus maintaining the dental floss 15 under proper tension. The bow frame 10 may be of any preferred form of cross section, material circular in cross section giving good results.

In the modified form shown in Figs. 5 and 6 the bow tips 11 and 13 are notched at 16′ and after the unit length of dental floss is inserted in the notches, the bow tips 11 and 13 are then softened by dipping them in a suitable solvent, and the bow tips are then pinched while in softened condition to seal the opposite ends 20 and 21 of the unit length of dental floss 15 in the notches. The plastic material is then allowed to dry and set, and the bow tips 11 and 13 are then released and permitted to spring apart to retain the dental floss 15 under proper tension.

In the construction shown in Fig. 7, instead of embedding the opposite ends of the unit length of dental floss 15 in the bow tips 11 and 13 as illustrated in Figs. 3 and 4, the opposite ends 20 and 21 of the unit length of dental floss 15 are anchored between the laminated plies of the walls of the hollow split sleeve members 18 and 19 (Fig. 8). The bow tips 11 and 13 which are notched at 16′, are moved towards each other under finger pressure while the unit length of dental floss 15 is inserted in the notches with the split sleeve members 18 and 19 engaging around the outer portions of the walls of the bow tips 11 and 13 respectively, so that when finger pressure is removed the arms of the bow frame 10 tend to spring apart and maintain the unit length of dental floss 15 under proper tension. The split sleeve members may be made either of Celluloid or of any other suitable inexpensive substitute therefor so long as the material of which the split sleeves 18 and 19 are composed is adapted to securely anchor the ends 20 and 21 in cooperation with a suitable Celluloid plastic or other plastic cement.

In the modification shown in Figs. 9, 10 and 11 the tips of the bow frame 10 are adapted to receive the caps 22 and 23 respectively wherein the opposite ends of the unit length of dental floss 15 are embedded. The caps 22 and 23 engage the opposite bow tips which then spring apart to maintain dental floss 15 under tension. Instead of embedding the ends of the dental floss in the caps 22 and 23, said caps may be made substantially in the form of beads 24 and 25 (Fig. 11) having the restricted orifices 27—27 increasing into the enlarged openings 26—26 adapted to engage the bow tips of bow frame 10; instead of embedding the opposite ends of the dental floss 15 in the material, said ends may be knotted as indicated at 28—28 (Fig. 11), and said knots engage against the shoulders defined by each orifice 27 and its associated enlarged opening 26 so as to prevent the knotted end from pulling through the orifice 27. When the beads 24 and 25 are inserted upon the tips of the bow frame the dental floss 15 will be stretched under tension as the arms of the bow frame spring apart in the manner previously described.

Instead of the construction shown in Figs. 7 and 8, the opposite ends of the unit length of dental floss may be anchored in the beads 30—30 (Fig. 14), either by embedding the said opposite ends in Celluloid plastic in the manner previously described or by knotting said opposite ends as indicated at 28—28 (Fig. 11) to prevent them from pulling out of the beads 30—30. The unit length of dental floss is then inserted in the notches 16′ (Fig. 13) with the beads engaging the outer walls of the bow tips (Fig. 12) so that when the arms of the bow frame spring apart the unit length of dental floss is maintained under proper tension. In this construction, like those shown in Figs. 7 to 11 inclusive, the unit length of dental floss 15 is detachable and replaceable.

In the modification shown in Figs. 15 and 16 the opposite ends of the unit length of dental floss 15 are wound in a notch 31 formed in the bow tip 11. The several turns of dental floss 32 (Fig. 16) are then sealed in the notches 31 in any preferred manner, as by applying a solvent such as acetone or the like to the bow tips 11 and 13, or by dipping, or cementing the dental floss in the bow tips in the manner previously described. The dental floss 15 may be wound in the notches 31 either before or after the bow tips 11 and 13 are plasticized. The plastic material is then allowed to dry and set, and after it is set the bow tips 11 and 13 are released and spring apart to maintain the stretched dental floss or thread 15 under proper tension.

Figs. 17 and 18 illustrate the construction of Figs. 15 and 16 as applied to a bow frame 10 made of non-circular material as distinguished from the bow frame 10 (Figs. 15 and 16) which is made of circular material. In the construction shown in Figs. 17 and 18 the bow tips 11—11 are notched at 16′ and the opposite ends of the unit length of dental floss 15 are wound in the notches 16′ to form several turns 32 which are then sealed in the manner previously described to prevent them from releasing.

In the modification shown in Fig. 19 the bow frame 10 is made of tubular Celluloid, and a unit loop of dental floss 15 is threaded through the bore 35 of the tubing. The opposite ends of the unit length of dental floss 15 are then knotted at 34 to form a loop, and the knot 34 may be positioned into the bore 35 of the tubing to protect it from working loose. When thus constructed the unit loop of dental floss may be removed and replaced after using. Knot 34 may however be embedded in the bore 35 of the tubing with Celluloid plastic 33, in which event the dental floss 15 will not be replaceable and the entire device may be thrown away after using.

Figs. 20, 21 and 22 illustrate another modified form of device wherein the bow tips 11—13 of the bow frame 10 are notched at 16'—16' to receive the dental floss 15 which is formed as a standard unit loop, the opposite ends of the dental floss being embedded in a shoe 35', made of Celluloid or other elastic material. When the loop of dental floss 15 is inserted in the notches 16'—16' (Fig. 20) a portion of said loop including the shoe 35' engages the outer wall of bow frame 10, and the shoe 35' may be sprung into clamping engagement with the wall of bow frame 10 as at the junction of the extension arms (Fig. 20). When the bow tips 11—13 are released they spring apart and maintain dental floss 15 stretched under proper tension.

Any of the sanitary throw-away dental units described may if preferred be utilized in conjunction with a suitable handle member to which said sanitary throw-away dental unit may be detachably secured.

Any of the sanitary unit lengths of dental floss may if preferred be used independently of the bow frame 10, each end of the unit length of dental floss serving as a grip instead of winding the dental floss around the finger or holding it between the fingers as in the present practice.

The construction shown in Fig. 23 is a modification of that shown in Figs. 20 to 22. The bow tips 11 and 13 are notched at 16'—16' as before. A centering device 41 forms an integral part of the bow frame 10 and the opposite ends of a length of dental floss 15 are embedded in a fastener 40 which is adapted to register in the centering device 41 when the standard unit loop of dental floss is threaded in the bow frame substantially as shown in Fig. 23.

The desired shape may be molded, or the L, V or U patterns may be cut out or punched out or the desired shape may be bent or formed in any suitable manner.

The handle member may be a separate piece or it may be molded, formed or cut in one piece with the extension arms.

In making the sanitary throw-away dental unit, the dental floss may be unwound from any suitable source of supply, and attached to and stretched between the bow tips 11 and 13 of the bow frame 10 while the air gap between the said bow tips is reduced under pressure, and a solvent such as acetone or the like is applied to plasticize the bow tips and embed the coiled ends 32 (Fig. 16) in the plasticized material which is then allowed to dry and set before the bow tips are released and spring apart to retain the stretched length of dental floss under proper tension.

What is claimed is:

1. A sanitary throw-away dental unit comprising a sterilized miniature bow shaped framework formed of plasticizable material, the arms of said bow being resilient and normally spaced apart at a distance slightly greater than the length of the span of a standard unit length of dental floss, a unit length of sterilized dental floss extending between the tips of said bow, the bow being small enough to be inserted in the mouth with the sterilized dental floss engageable in the space between adjacent teeth, and means comprising Celluloid plastic wherein the opposite ends of the length of dental floss are embedded, said plastic being operable when set hard to anchor the ends of said dental floss to said bow tips so as to retain said dental floss under tension at all times between said bow tips when the latter are allowed to return to their normal position.

2. A throw-away dental unit comprising a unit length of dental floss, and a plurality of anchored means made of plasticizable material wherein the opposite ends of said unit length of dental floss are embedded while in plastic condition, said plastic material being thereafter permitted to harden and set.

3. A throw-away dental unit comprising a unit length of dental floss, and a plurality of anchoring means made of plasticizable material wherein the opposite ends of said unit length of dental floss are embedded while in plastic condition, said plastic material being thereafter permitted to harden and set, said anchoring means co-acting with the tips of the throw-away unit to maintain said unit length of dental floss under tension between the tips of a dental holder.

4. The combination with a sanitary throw-away dental unit comprising a sterilized miniature bow shaped frame formed of elastic material, of means for attaching the opposite ends of a length of dental floss to the tips of said frame comprising a plasticizable material wherein the opposite ends of said length of dental floss are embedded while said material is plasticized, the tips of said frame springing apart when released after said material is set hard and properly attached to the tips of said frame.

5. A sanitary dental unit comprising a sterilized miniature bow shaped resilient framework made of elastic tubular material, a standard unit length of dental floss threaded through said tubing and extended between the spaced tips of said bow, and the ends of said length of dental floss being joined together while the space between said bow tips is temporarily reduced to form a loop of dental floss which will be stretched under proper tension when the bow tips are allowed to return to their normal position.

6. A dental floss loop comprising a length of dental floss, and means for anchoring the opposite ends of said dental floss length together to complete said loop including a plasticizable material wherein the said floss ends were permanently embedded while said material was temporarily plasticized.

7. A dental floss loop comprising a length of dental floss, and a shoe member made of plasticizable material wherein the opposite ends of said dental floss length were permanently embedded while said material was temporarily plasticized to complete said floss loop.

8. In a sanitary dental unit the combination with a resilient framework substantially bow shaped in configuration, of a throw-away dental floss unit comprising a length of dental floss, and plasticizable material wherein the ends of said dental floss are permanently embedded, said plasticizable material being demountably mountable upon said resilient framework so as to string said dental floss under tension between the tips of said bow.

9. In a sanitary throw-away dental unit the combination with a sterilized miniature bow shaped framework formed of plasticizable material, the arms of said bow being resilient and normally spaced apart at a distance slightly greater than the length of a span of a standard unit length of dental floss, a unit length of sterilized dental floss extending between the tips of said bow, the bow being small enough to be inserted in the mouth with the sterilized dental floss engageable in the space between adjacent teeth, and means comprising Celluloid plastic wherein the opposite ends of the length of dental floss are embedded, said plastic being operable when set hard to anchor the ends of said dental floss to said bow tips so as to retain said dental floss under tension at all times between said bow tips when the latter are allowed to return to their normal position; of a handle member wherein said dental unit may be detachably secured.

10. The method of making a throw-away dental floss unit which consists in embedding the ends of a length of dental floss in plasticizable material while in plastic condition, and retaining said floss ends embedded in the plastic material until said material has set.

11. The method of making a sanitary dental floss unit which consists in temporarily plasticizing the plasticizable spaced tips of a resilient frame member, and temporarily reducing the normal spacing between said tips while embedding the ends of a length of dental floss in the plasticized tips of said frame member.

12. The method of making a sanitary dental unit which consists in plasticizing the plasticizable spaced tips of a resilient frame member, reducing the normal spacing between said resilient spaced tips while embedding the ends of a length of dental floss in the plasticized material, and allowing said material to harden and set before releasing said tips.

ISABELLE HENNE.